US009177480B2

(12) United States Patent
Subbu et al.

(10) Patent No.: US 9,177,480 B2
(45) **Date of Patent: *Nov. 3, 2015**

(54) SCHEDULE MANAGEMENT SYSTEM AND METHOD FOR MANAGING AIR TRAFFIC

(71) Applicants: General Electric Company, Schenectady, NY (US); Lockheed Martin Corporation, Bethesda, MD (US)

(72) Inventors: Rajesh Venkat Subbu, Clifton Park, NY (US); David So Keung Chan, Niskayuna, NY (US); Glen William Brooksby, Niskayuna, NY (US); Joel Kenneth Klooster, Seattle, WA (US); Sergio Torres, Bethesda, MD (US)

(73) Assignees: Lockheed Martin Corporation, Bethesda, MD (US); General Electric Company, Schenectady, NY (US)

( * ) Notice: Subject to any disclaimer, the term of this patent is extended or adjusted under 35 U.S.C. 154(b) by 55 days.

This patent is subject to a terminal disclaimer.

(21) Appl. No.: 13/786,858

(22) Filed: Mar. 6, 2013

(65) Prior Publication Data

US 2013/0184978 A1 Jul. 18, 2013

Related U.S. Application Data

(63) Continuation-in-part of application No. 13/032,176, filed on Feb. 22, 2011, now Pat. No. 8,942,914.

(60) Provisional application No. 61/666,801, filed on Jun. 30, 2012.

(51) Int. Cl.

*G06F 19/00* (2011.01)
*G08G 5/00* (2006.01)

(52) U.S. Cl.

CPC ............ *G08G 5/0043* (2013.01); *G08G 5/0013* (2013.01); *G08G 5/0082* (2013.01)

(58) Field of Classification Search

USPC .................... 701/120–122, 3, 4, 14, 411, 465
See application file for complete search history.

(56) References Cited

U.S. PATENT DOCUMENTS

| | | | |
|---|---|---|---|
| 4,774,670 | A | 9/1988 | Palmieri |
| 5,574,647 | A | 11/1996 | Liden |

(Continued)

FOREIGN PATENT DOCUMENTS

| | | | |
|---|---|---|---|
| CN | 101465064 | A | 6/2009 |
| CN | 101527086 | A | 9/2009 |

(Continued)

OTHER PUBLICATIONS

Sergio Torres et al., "Trajectory Management Driven by User Preferences", 30th Digital Avionics Systems Conference, pp. 1-11, Oct. 16-20, 2011.

(Continued)

*Primary Examiner* — Russell Frejd
*Assistant Examiner* — Luke Huynh
(74) *Attorney, Agent, or Firm* — General Electric Company; William S. Munnerlyn

(57) ABSTRACT

A system and method to improve efficiency in aircraft maneuvers meant to accommodate time-related constraints in air traffic. Information related to flight performance and atmospheric conditions is gathered onboard an aircraft, then transmitted to an air traffic control center. In the event of a delay or any other event which necessitates an alteration in an aircraft trajectory, the data is sent to a decision support tool to compute and provide alternative trajectories, preferably including operator-preferred trajectories, within air traffic constraints. Air traffic controllers can then offer an alternative trajectory to an aircraft that is more efficient, cost effective, and/or preferable to the aircraft operator.

10 Claims, 4 Drawing Sheets

(56) References Cited

U.S. PATENT DOCUMENTS

| | | | |
|---|---|---|---|
| 5,961,568 | A | 10/1999 | Farahat |
| 6,148,259 | A | 11/2000 | Hagelauer |
| 6,314,362 | B1 | 11/2001 | Erzberger et al. |
| 6,463,383 | B1 | 10/2002 | Baiada et al. |
| 6,604,044 | B1 | 8/2003 | Kirk |
| 6,606,553 | B2 | 8/2003 | Zobell et al. |
| 6,721,714 | B1 | 4/2004 | Baiada et al. |
| 6,789,011 | B2 | 9/2004 | Baiada et al. |
| 6,873,903 | B2 | 3/2005 | Baiada et al. |
| 7,248,949 | B2 | 7/2007 | Love et al. |
| 7,248,963 | B2 | 7/2007 | Baiada et al. |
| 7,313,475 | B2 | 12/2007 | Green |
| 7,333,887 | B2 | 2/2008 | Baiada et al. |
| 7,457,690 | B2 | 11/2008 | Wilson et al. |
| 7,606,658 | B2 | 10/2009 | Wise et al. |
| 7,611,098 | B2 | 11/2009 | Van Boven |
| 7,623,957 | B2 | 11/2009 | Bui et al. |
| 7,788,027 | B2 | 8/2010 | Jones et al. |
| 7,813,871 | B2 | 10/2010 | Small et al. |
| 7,844,373 | B2 | 11/2010 | Deker |
| 7,877,197 | B2 | 1/2011 | Lewis et al. |
| 8,565,938 | B2 | 10/2013 | Coulmeau et al. |
| 2003/0050746 | A1 | 3/2003 | Baiada et al. |
| 2003/0139875 | A1 | 7/2003 | Baiada et al. |
| 2004/0193362 | A1 | 9/2004 | Baiada et al. |
| 2006/0224318 | A1 | 10/2006 | Wilson |
| 2008/0215196 | A1 | 9/2008 | Deker |
| 2009/0005960 | A1 | 1/2009 | Roberts et al. |
| 2009/0012660 | A1 | 1/2009 | Roberts et al. |
| 2009/0037091 | A1 | 2/2009 | Bolt et al. |
| 2009/0125221 | A1 | 5/2009 | Estkowski et al. |
| 2009/0157288 | A1* | 6/2009 | Bailey et al. .................. 701/121 |
| 2009/0259351 | A1 | 10/2009 | Wachenheim et al. |
| 2010/0049382 | A1 | 2/2010 | Akalinli et al. |
| 2010/0125382 | A1* | 5/2010 | Wachenheim et al. ......... 701/18 |
| 2010/0131125 | A1 | 5/2010 | Blanchon et al. |
| 2010/0241345 | A1 | 9/2010 | Cornell et al. |
| 2011/0208376 | A1 | 8/2011 | Mere et al. |
| 2012/0004837 | A1 | 1/2012 | McDonald |

FOREIGN PATENT DOCUMENTS

| | | | |
|---|---|---|---|
| FR | 2916842 | A1 | 12/2008 |
| GB | 2404468 | A | 2/2005 |
| WO | 02095712 | A2 | 11/2002 |
| WO | 2009042405 | A2 | 4/2009 |
| WO | 2009082785 | A1 | 7/2009 |

OTHER PUBLICATIONS

Miwa Hayashi et al., "Impacts of Intermediate Cruise-Altitude Advisory for Conflict-Free Continuous-Descent Arrival", AIAA Guidance Navigation and Control Conference, pp. 1-15, Aug. 8-11, 2011.

Thomas Prevot et al., "Efficient Arrival Management Utilizing ATC and Aircraft Automation", International Conference on Human-Computer Interaction in Aeronautics, pp. 1-7, 2000.

Steven Green M et al., "Field Evaluation of Descent Advisor Trajectory Prediction Accuracy for En-route Clearance Advisories", American Institute of Aeronautics and Astronautics , pp. 1-18, 1998.

Adan E. Vela and Senay Solak; Eric Feron, Karen Feign, and William Singhose; "A Fuel Optimal and Reduced Controller Workload Optimization Model for Conflict Resolution", Aug. 2009, 978-1-4244-4078.

Iab Wilson, "Trajectory Negotiation in a Multi-sector Environment", EuroControl, Bruxelles, Doc 97-70-14, Jun. 1998.

Peter M. Moertl and Emily K Beaton; Paul U. Lee, Vernol Battiste, and Nancy M. Smith; "An Operational Concept and Evaluation of Airline Based En Route Sequencing and Spacing", 2007.

Daniel B. Kirk, Karen C. Bowen, Winfield S. Heagy, Nicholas E. Rozen, Karen J. Viets; "Development and Assessment of Problem Resolution Capabilities for the En Route Sector Controller"; The Mitre Corporation; American Institute of Aeronautics and Astronautics, AIAA-2001-5255, 2001.

Ohn P. Wangermann and Robert F. Stengel; "Optimization and Coordination of Multiagent Systems Using Principled Negotiation"; Journal of Guidance, Control and Dynamics, vol. 22, No. 1, Jan.-Feb. 1999.

Eric Mueller, Sandy Lozito; "Flight Deck Procedural Guidelines for Datalink Trajectory Negotiation"; American Institute of Aeronautics and Astronautics, 2008.

NextGen Avionics Roadmap; Joint Planning and Development Office, Version 1.0, Oct. 24, 2008.

Richard A. Coppenbarger, Richard Lanier, Doug Sweet and Susan Dorsky; "Design and Development of the En Route Descent Advisor (EDA) for Conflict-Free Arrival Metering"; American Institute of Aeronautics and Astronautics, 2004.

Rich Coppenbarger; "Trajectory Negotiation & En Route Data Exchange DAG CE-6"; DAG Workshop, May 22-24, 2000.

Joel Klooster, Sergio Torres, Daniel Earman, Mauricio-Castillo-Effen, Raj Subbu, Leonardo Kammer, David Chan, Tom Tomlinson; "Trajectory Synchronization and Negotiation in Trajectory Based Operations", 2010.

Steven M. Green, Dr. Tsuyoshi Goka, David H. Williams; "Enabling User Preferences Through Data Exchange", 1997.

Dr. Daniel B. Kirk, Winfield S. Heagy, Alvin L. McFarland, Michael J. Yablonski; "Preliminary Observations About Providing Problem Resolution Advisories to Air Traffic Controllers"; The MITRE Corporation, 2000.

Daniel B. Kirk, "Enhanced Trial Planning and Problem Resolution Tools to Support Free Flight Operations"; Aug. 2000; Project No. 02001301-U1; MITRE Paper.

Daniel B. Kirk, Winfield S. Heagy, and Michael J. Yablonski; "Problem Resolution Support for Free Flight Operations"; IEEE Transactions on Intelligent Transportation Systems, vol. 2, No. 2, Jun. 2001.

Daniel B. Kirk, Karen C. Bowen, Winfield S. Heagy, Nicholas E. Rozen, Karen J. Viets; "Problem Analysis, Resolution and Ranking (PARR) Development and Assessment"; The MITRE Corporation; 4th USA/Europe Air Traffic Management R&D Seminar, Dec. 3-7, 2001.

Paul U. Lee, Jean-Francois D'Arcy, Paul Mafera, Nancy Smith, Vernol Battiste, Walter Johnson, Joey Mercer, Everett A. Palmer, Thomas Prevot; "Trajectory Negotiation via Data Link: Evaluation of Human-in-the-loop Simulation", 2004.

Marcus B. Lowther, Dr. John-Paul B. Clarke, and Dr. Liling Ren; "En Route Speed Change Optimization for Spacing Continuous Descent Arrivals"; AGIFORS Student Paper Submission, 2008.

Joint Planning and Development Office, Concept of Operations for the Next Generation Air Transportation System, Version 2.0, Jun. 13, 2007.

Liling Ren and John-Paul B. Clarke; "Separation Analysis Methodology for Designing Area Navigation Arrival Procedures"; Journal of Guidance, Control, and Dynamics; vol. 30, No. 5, Sep.-Oct. 2007.

Liling Ren and John-Paul B. Clarke; "Flight-Test Evaluation of the Tool for Analysis of Separation and Throughput"; Journal of Aircraft; vol. 45, No. 1, Jan.-Feb. 2008.

G. J. Couluris; "Detailed Description for CE6 En route Trajectory Negotiation"; Technical Research in Advanced Air Transportation Technologies; Nov. 2000; NAS2-98005 RTO-41.

Harry N. Swenson, Ty Hoang, Shawn Engelland, Danny Vincent, Tommy Sanders, Beverly Sanford, Karen Heere; "Design and Operational Evaluation of the Traffic Management Advisory at the Fort Worth Air Route Traffic Control Center"; 1st USA/Europe Air Traffic Management Research Development Seminar; France, Jun. 17-19, 1997.

Robert et al., "Abstraction Techniques for Capturing and Comparing Trajectory Predictor Capabilities and Requirements", AIAA Guidance, Navigation and Control Conference and Exhibit, Aug. 18-21, 2008, Honolulu, Hawaii.

Edward et al., "Enhanced ADS-B",STAR. vol. 45, No. 9. May 14, 2007.

Kyle O'Brien et al., "Rigorous Bounding of Position Error Estimates for Aircraft Surface Movement", B6-1-B6-9, 2010.

European Search Report and Opinion issued in connection with corresponding EP Application No. 12156074.2 on Nov. 8, 2013.

Search Report and Written Opinion from PCT/2013/045655 dated Oct. 11, 2013.

(56) References Cited

OTHER PUBLICATIONS

Coppenbarger, "Climb trajectory prediction enhancement using airline flight-planning information", American Institute of Aeronautics and Astronautics, pp. 1-11, 1999.
Karr et al., "Experimental Performance of a Genetic Algorithm for Airborne Strategic Conflict Resolution", American Institute of Aeronautics and Astronautics, pp. 1-15, Jan. 1, 2009.
Eurocontrol, "ADAPT2 Aircraft Data Aiming at Predicting the Trajectory", Data analysis report, Dec. 2009.
Coppenbarger et al., "Development and Testing of Automation for Efficient Arrivals in Constrained Airspace", 27th International Congress of The Aeronautical Sciences, pp. 1-14, 2010.
Hagen et al., "Stratway: A Modular Approach to Strategic Conflict Resolution", pp. 1-13, Jan. 1, 2011.
Unofficial English translation of Office Action issued in connection with corresponding CN Application No. 201210050379.8 on Jan. 14, 2015.

* cited by examiner

SCHEDULE MANAGEMENT SYSTEM AND METHOD FOR MANAGING AIR TRAFFIC

CROSS REFERENCE TO RELATED APPLICATIONS

This application claims the benefit of U.S. Provisional Application No. 61/666,801 filed Jun. 30, 2012, the contents of which are incorporated herein by reference. In addition, this application is a continuation-in-part patent application of co-pending U.S. patent application Ser. No. 13/032,176 filed Feb. 22, 2011, the contents of which are incorporated herein by reference.

BACKGROUND OF THE INVENTION

The present invention generally relates to methods and systems for managing air traffic. More particularly, this invention relates to methods and systems used to optimize air traffic control operations and minimize losses in air traffic efficiency, and includes methods and systems for managing the time schedule for arriving aircraft by including early cruise descents as a means of absorbing time delays resulting from one or more aircraft missing its/their scheduled time of arrival (STA).

Managing the time schedule for aircraft approaching their arrival airport is an important air traffic management task performed by air traffic control. It is important to deliver an arriving aircraft to an arrival meter fix within an allowance parameter around a STA, despite interference from weather effects and other air traffic. In modern air traffic, a single airplane missing its STA will have downstream air traffic consequences, possibly including missing landing slots.

An accurate four dimensional trajectory (4DT) in space (latitude, longitude, altitude) and time enables air traffic control to evaluate air traffic and the future location of an aircraft. These parameters can also be used by air traffic control for schedule management purposes to absorb an air traffic delay and change the arrival time of downstream air traffic by longitudinal (speed changes), lateral (flight path lengthening or shortening), or vertical (lowering the cruise altitude to reduce speed) alterations. Currently, a combination of speed changes and lateral alterations in flight paths is used to absorb time delays.

As used herein, trajectory is a time-ordered sequence of three-dimensional positions an aircraft follows from take-off to landing, and can be described mathematically. In contrast, a flight plan is a series of documents that are filed by pilots or a flight dispatcher with a civil aviation authority that includes such information, such as departure and arrival locations and times, that can be used by air traffic control (ATC) to provide tracking and routing services. Trajectory is a means of fulfilling an intended flight plan, with uncertainties in time and position.

Trajectory Based Operations (TBO) is an important component of advanced air traffic systems to be implemented sometime in the near future, including the US Next Generation Air Transport System (NextGen) and the European Single European Sky ATM Research (SESAR). TBO concepts provide the basis for improved airspace operation efficiency. Trajectory synchronization and negotiation implemented in TBO also enable airspace users (including flight operators, flight dispatchers, flight deck personnel, Unmanned Aerial Systems, and military users) to regularly fly trajectories closer to their preferred trajectories, enabling business objectives, including fuel and time efficiency, wind-optimal routing, and weather-related trajectory changes, to be incorporated into TBO concepts. As a result, significant research has gone into developing the system framework and technologies to enable TBO.

An overarching goal of TBO is to reduce uncertainty associated with the prediction of an aircraft's future location through the use of the aforementioned 4DT in space and time. The precise use of 4DT dramatically reduces uncertainty in determining an aircraft's current and future position and trajectory relative to time, and includes the ability to predict when an aircraft will reach an arrival meter fix (a geographic location also referred to as a metering fix, arrival fix, or cornerpost) as the aircraft approaches its arrival airport. Currently, air traffic control relies on "clearance-based control" systems, which depends on observations of an aircraft's current location, typically without much further knowledge of the aircraft's trajectory. Typically, this results in the aircraft flying a route that is determined by air traffic control and which is not the aircraft's preferred trajectory. Switching to TBO would allow an aircraft to fly along a user-preferred trajectory.

In TBO, user preferences determine the choices made in air traffic operations. More specifically, aircraft trajectories and operational procedures are a direct result of the business objectives of the aircraft operator. A fundamental element of these business objectives is the Cost Index, (CI) which is the ratio of time costs (costs per minute) to fuel costs (cost per kg) of an aircraft in flight. The CI of an aircraft determines its optimal flight speed and trajectory, and is a function of atmospheric conditions, aircraft performance capabilities and trajectory, and as a result is nearly unique to every flight. In addition, factors such as speed and altitude do not necessarily increase linearly with increasing CI. As such, the computation of CI in ground simulation is difficult.

Currently, air traffic controllers maintain traffic patterns with the first concern being safety and separation between aircrafts. Such patterns are made with no concern for preferred aircraft trajectories, and as such no efforts are made by air traffic controllers to conserve costs for the aircraft operators. It has been observed that in instances such as this, other viable trajectory changes may be made which are much more cost effective. The optimization and computation required to determine a preferable trajectory would most likely not be possible by a human operator or traffic controller, and would need to be provided by a computer system. In such a case, a computer would provide preferable trajectory options to a human operator, who would then choose from a series of possible trajectories.

For TBO to function effectively, it requires accumulation and compilation of trajectory data from all relevant aircraft. User-preferred trajectories, those which are most desirable by the aircraft operators, may often conflict with one another, especially in air traffic systems which are no longer-clearance based. Although TBO will improve efficiency, it must deal with trajectory and traffic conflicts. Trajectory negotiation determines the trajectory requirements or intentions of a variety of aircraft, and attempts to form a solution which meets as many user preferences as possible and make the best use of available airspace. Such a trajectory negotiation relies on aircraft trajectory data as well as human decision-making and trajectory preferences.

Currently, lateral changes to a flight path, as well as speed changes, are used to absorb air traffic flight delays. However, it would be desirable if early-descent trajectory changes could be used to absorb flight delays in air traffic. The National Aeronautics and Space Administration's (NASA) Ames Research Center has researched the feasibility of using altitude change (descent) advisory capability in NASA's En- Route Descent Advisor (EDA) by conducting human-in-the-loop simulation experiments with experienced Air Route Traffic Control Center (ARTCC) sector controllers, as reported in a paper published at the AIAA Guidance, Navigation, and Control Conference, entitled "Impacts on Intermediate Cruise-Altitude Advisory for Conflict-Free Continuous-Descent Arrival," Aug. 8-11, 2011, Portland, Oreg. USA.

In a continuous-descent or early-descent trajectory, an aircraft begins descending at an idle or near-idle thrust setting much earlier than in a standard trajectory. By beginning a slow descent much earlier in a flight path, a time delay may be absorbed, and less fuel may be exhausted. The basic outline of an early-descent trajectory is shown in FIG. 1. An aircraft following an early-descent trajectory may either continuously descend to an appointed meter-fix location, or descend to an intermediate lower altitude, allowing it to fly at a slower speed to absorb a flight delay and potentially consume less fuel.

When a time delay in air traffic must be absorbed, early-descent maneuvers may provide a distinct cost advantage over lateral or speed changes to an aircraft's trajectory. However, determining preferable trajectories that meet air traffic safety constraints, absorb proper delay and conserve fuel is most likely beyond the computational capabilities of human controllers, especially if the human controllers are preoccupied with preventing air traffic conflicts. Therefore, a system must be in place which is capable of determining a preferable trajectory, or several preferable trajectories, which may include an early-descent maneuver, and then capable of providing these trajectories to a human controller who can relay the command on to the aircraft pilots. In the event that an air traffic conflict necessitates an aircraft maneuver to absorb a time delay, this system would provide trajectory options preferable to a simple lateral or longitudinal change in aircraft trajectory, while still being conscious of the air traffic safety and operational constraints due to surrounding traffic.

U.S. Patent Application Publication No. 2009/0157288 attempts to solve a similar problem, but limits the actors in the solution to individual aircraft. An aircraft receives only a time delay factor from air traffic control and, in isolation from any additional information from ground systems, determines the best trajectory modification to meet this time delay.

While information and decision-making can be left entirely to either an aircraft or ground systems, there are limitations to the accuracy and availability of information in either of these approaches. Typically, such calculations are contingent on the entirety of air traffic conditions in the vicinity of the aircraft, and therefore the results of such decision making are not isolated to the aircraft.

BRIEF DESCRIPTION OF THE INVENTION

The present invention provides methods and systems for managing the time schedule for arriving aircraft approaching their arrival airport. The invention provides means for altering aircraft flight trajectories including, but not limited to, early cruise descents, in order to compensate for air traffic scheduling changes including, but not limited to, time delays resulting from one or more aircrafts missing its/their STA (scheduled time of arrival).

According to a first aspect of the invention, a schedule management system is provided for managing air traffic comprising multiple aircraft that are within a defined airspace and approaching an arrival airport, with each of the multiple aircraft having existing trajectory parameters comprising three-dimensional position and velocity. The schedule management system includes on-aircraft flight management systems (FMSs) individually associated with the multiple aircraft and adapted to determine aircraft trajectory and flight-specific cost data of the aircraft associated therewith, and an air traffic control system that is adapted to monitor the multiple aircraft but is not located on any of the multiple aircraft. The air traffic control system has a decision support tool and is operable to acquire the aircraft trajectory and the flight-specific cost data from the FMS and generate a STA for each of the multiple aircraft for at least one location (for example, a meter fix point) along an approach to the arrival airport. If any of the multiple aircraft miss the STA thereof at the location and thereby delays a second of the multiple aircraft flying towards the location to impose a later STA for the second aircraft, the air traffic control system is operable to transmit the aircraft trajectory and the flight-specific cost data to the decision support tool, utilize the decision support tool to determine if a particular trajectory alteration is more cost-efficient for the second aircraft to absorb the delay associated with the later STA, and then transmit instructions to the second aircraft based on a human decision facilitated by the decision support tool.

According to a second aspect of the invention, a method is provided for managing air traffic comprising multiple aircraft that are within a defined airspace and approaching an arrival airport, with each of the multiple aircraft having existing trajectory parameters comprising three-dimensional position and velocity. The method includes determining aircraft trajectory and flight-specific cost data of each of the multiple aircraft with on-aircraft FMS individually associated with the multiple aircraft, monitoring the multiple aircraft with an air traffic control system that is not located on any of the multiple aircraft, and then generating with the air traffic control system a STA for each of the multiple aircraft for at least one location (for example, a meter fix point) along an approach to the arrival airport. If any of the multiple aircraft miss the STA thereof at the location and thereby delays a second of the multiple aircraft flying towards the location to impose a later STA for the second aircraft, then the method further comprises transmitting the aircraft trajectory and the flight-specific cost data acquired from the FMSs to a decision support tool of the air traffic control system, utilizing the decision support tool to determine if a particular trajectory alteration is more cost-efficient for the second aircraft to absorb the delay associated with the later STA, and then transmitting instructions to the second aircraft based on a human decision facilitated by the decision support tool.

A technical effect of the invention is that, while prior approaches to managing time schedules for arriving aircraft have relied on information and decision-making that are left entirely to either the individual aircraft or a ground system, the present invention seeks to provide an accurate and comprehensive schedule management system that uses aircraft and flight data received from aircraft within the sphere of influence of a ground-based air traffic control system, for example, an air traffic control center, and then uses decision support tools (DST) of the ground system to compute the estimated time of arrival (ETA) for each aircraft being managed and determine whether there is a requirement to absorb a time delay or temporally advance an aircraft.

Other aspects and advantages of this invention will be better appreciated from the following detailed description.

DETAILED DESCRIPTION OF THE INVENTION

Figure 1:
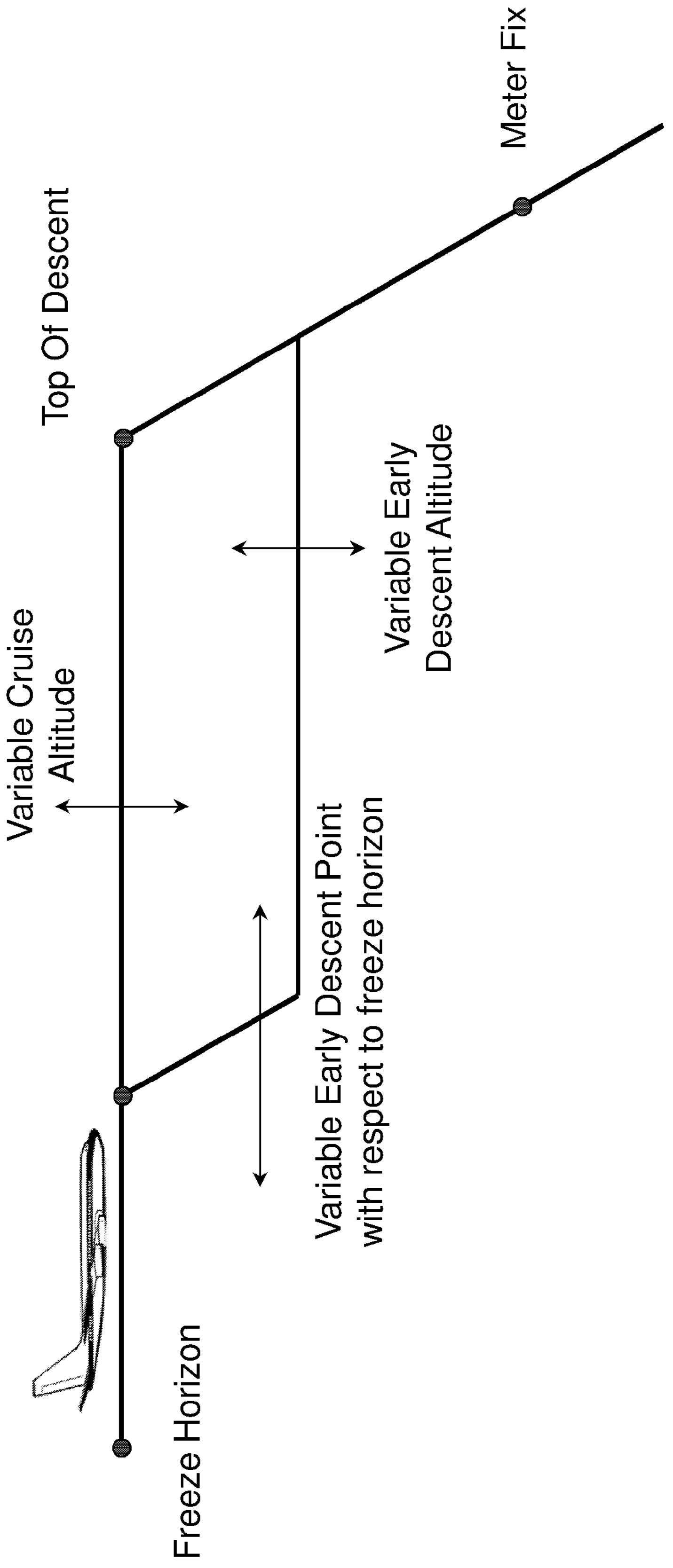
FIG. 1 schematically represents a basic outline of early-descent trajectories that can be implemented by embodiments of the present invention.

The present invention provides a schedule management system and method for managing air traffic approaching an arrival airport. According to a preferred aspect of the invention, aircraft within the airspace are equipped with on-aircraft flight management systems (FMSs) that determine aircraft trajectory and flight-specific cost data of the individual aircraft on which they are installed. The schedule management system receives the aircraft trajectory and flight-specific cost data from the FMSs of the aircraft within the sphere of influence of an air traffic control (ATC) center whose ground system is equipped with a decision support tool (DST). The air traffic control system determines the scheduled time-of-arrival (STA) for the aircraft at one or more meter fix points along one or more approaches to the arrival airport and, if any aircraft misses its STA and thereby imposes a time delay on one or more other aircraft flying towards the meter fix point, the DST utilizes the aircraft trajectory and flight-specific cost data of the other (delayed) aircraft to determine if aircraft trajectories changes would be advantageous in absorbing the time delay(s). If appropriate, such a determination can be transmitted to the delayed aircraft by air traffic control personnel.

According to a preferred aspect of the invention, flight-specific cost information is generated by aircraft and provided to the DST for analysis. Based on existing computational capabilities, the DST is preferably part of a ground-based computer system and not on an aircraft. This provides larger data storage and processing capabilities, given that the DST can be of a much larger size, designed to fit in a room or building and not in an aircraft cabin. The ground-based DST also provides a better medium for compiling incoming data from multiple aircraft under the control of an air traffic control system. It should be noted that this embodiment of the invention offers the capability of facilitating advances in air traffic control, in particular, to accommodate advanced air traffic systems such as Trajectory Based Operations (TBO) to be implemented in the future, including the NextGen and SESAR evolutions. As such, the DST is designed to work not just with one aircraft, but with a large number of different aircraft, trajectories, positions, and time constraints.

An arrival manager (AMAN) is commonly used in congested airspace to compute an arrival schedule for aircraft at a particular airport. The computer system of the schedule management system can use aircraft surveillance data and/or a predicted trajectory from the aircraft to construct a schedule for aircraft arriving at a point, typically a metering fix located at the terminal airspace boundary. Today, this function is performed by the FAA's Traffic Management Advisor (TMA) in the USA, while other AMANs are used internationally. In general, this invention can make use of an arrival scheduler tool that monitors the aircraft based on aircraft data and computes the sequences and STAs of arriving aircraft to the metering fix. Although most current schedulers compute STAs using a first-come first-served algorithm, there are many different alternative schedule means, including a best-equipped best-served type of schedule. On the other hand, the DST is an advisory tool used to generate the alternative trajectories that will enable a later-arriving aircraft to accurately perform an early-descent trajectory (which may result in reduced speed) that will deliver the aircraft to the metering fix according to the delayed STA computed by the computer system for the later-arriving aircraft.

Figure 2:
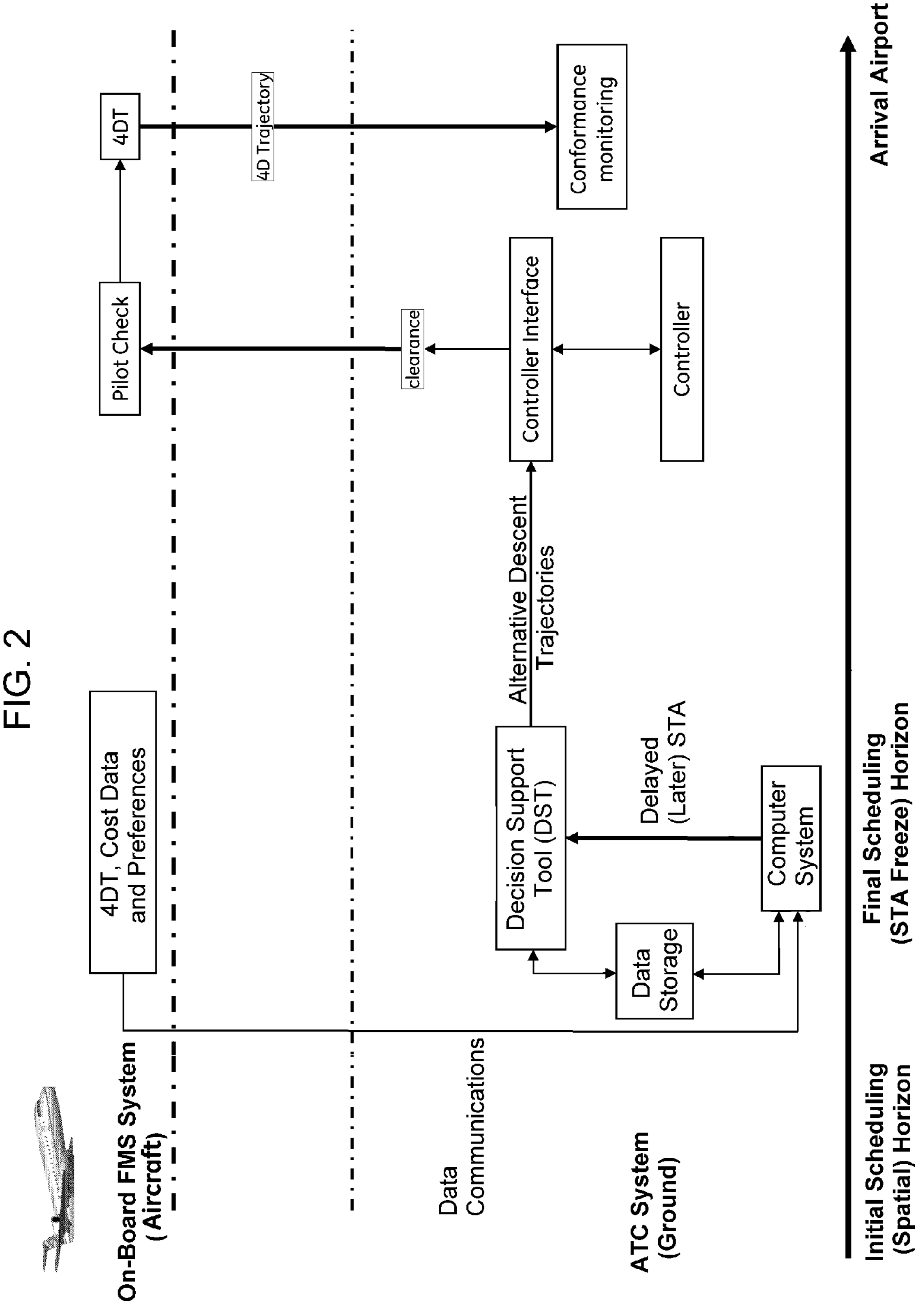
FIG. 2 is a block diagram of a schedule management method and system for managing air traffic approaching an arrival airport on the basis of the trajectories and flight-specific cost data of the individual aircraft.

As a nonlimiting example of an implementation and operation of a schedule management system of this invention, FIG. 2 represents an air traffic conflict that has arisen in the vicinity of an airport, in which two aircraft will reach the traffic pattern of the airport at the same time. In the scenario to be described in reference to FIG. 2, one aircraft (depicted in FIG. 2) must be delayed so that the other aircraft (not shown) can enter the traffic pattern first and an adequate amount of space will be provided between the aircraft. Though an air traffic controller could simply request that the delayed aircraft reduce its cruise speed or make another simple trajectory change, doing so may not be the most cost-effective or desirable solution for the aircraft operator. Within the schedule management system, the air traffic control system is provided with a ground-based computer system that monitors the 4D (altitude, lateral route, and time) trajectory (4DT) of each aircraft as it enters the airspace being monitored by the air traffic control system. The aircraft, appropriately equipped with an on-board FMS (or, for example, a Data Communication (DataComm) system) are capable of providing this information directly to the computer system. In particular, many advanced FMSs are able to accurately compute 4DT data, which can be exchanged with the computer system using CPDLC, ADS-C, or another data communications mechanism between the aircraft and air traffic control system, or another digital exchange from a flight dispatcher.

For each aircraft within the monitored airspace, the computer system associated with the air traffic control system computes an estimated time of arrival (ETA) for at least one metering fix associated with the arrival (destination) airport shared by the aircraft. ETAs for multiple aircraft are stored in a queue that is part of a data storage unit that can be accessed by the computer system and its DST. In the scenario described in reference to FIG. 2 in which a first aircraft (not shown) enters the traffic pattern first resulting in the delay of another aircraft (depicted in FIG. 2), the computer system performs a computation to determine, based on information inferred or downlinked from the aircraft, the ETA of the first aircraft and an appropriate delay time for the delayed aircraft.

With the use of the 4DT, flight-specific cost data, and optionally preferences based on business objectives of the aircraft operator acquired from the delayed aircraft, the computer system utilizes the DST to compute several possible alternative trajectories which would adequately delay the delayed aircraft and resolve the traffic conflict while also conserving aircraft operating costs by potentially initiating an early descent. In this case, through the use of an appropriate ATCo interface (such as a graphic/user interface), an air traffic controller can choose one of the possible trajectories, potentially including an early descent, recommended by the DST and relay this request to the delayed aircraft. As such, a human can still make the decision to change the trajectory of the aircraft, but the DST facilitates better operational efficiency by computing and recommending more cost-effective solutions that may include one or more early-descent trajectories. Once the descent trajectory request has been noted ("Pilot Check") and implemented ("4DT") by the delayed aircraft, the air traffic control system can continue to monitor the trajectory of the aircraft for conformance to the request. If necessary and possible, the air traffic control system may update the ETAs to the meter fix for each aircraft stored in the queue of the data storage.

As indicated in FIG. 2, the schedule management system can be implemented to work in reference to initial and final scheduling horizons. The initial scheduling horizon is a spatial horizon, which is the position at which each aircraft enters the given airspace, for example, the airspace within about 200 nautical miles (370.4 km) of the arrival airport. The ATM system monitors the positions of aircraft and is triggered once an aircraft enters the initial scheduling horizon. The final scheduling horizon, also referred to as the STA freeze horizon, is defined by a specific time-to-arriving metering fix. The STA freeze horizon may be defined as an aircraft's metering fix ETA of less than or equal to, for example, twenty minutes in the future. Once an aircraft has penetrated the STA freeze horizon, its STA remains unchanged, the schedule management system is triggered, and any meet-time maneuver is uplinked to the aircraft to carry out one of the alternative trajectories devised by the DST of the schedule management system.

The basic outline of an early-descent trajectory for the delayed aircraft is schematically represented in FIG. 1, which evidences that the aircraft begins descending (for example, at an idle or near-idle thrust setting) much earlier than in a standard trajectory. By beginning a slow descent much earlier in a flight path, a time delay is absorbed and, in preferred embodiments, less fuel is exhausted. The aircraft may either continuously descend to an appointed meter-fix location or descend to an intermediate lower altitude, allowing it to fly at a slower speed to absorb a flight delay and consume less fuel.

Figure 3:
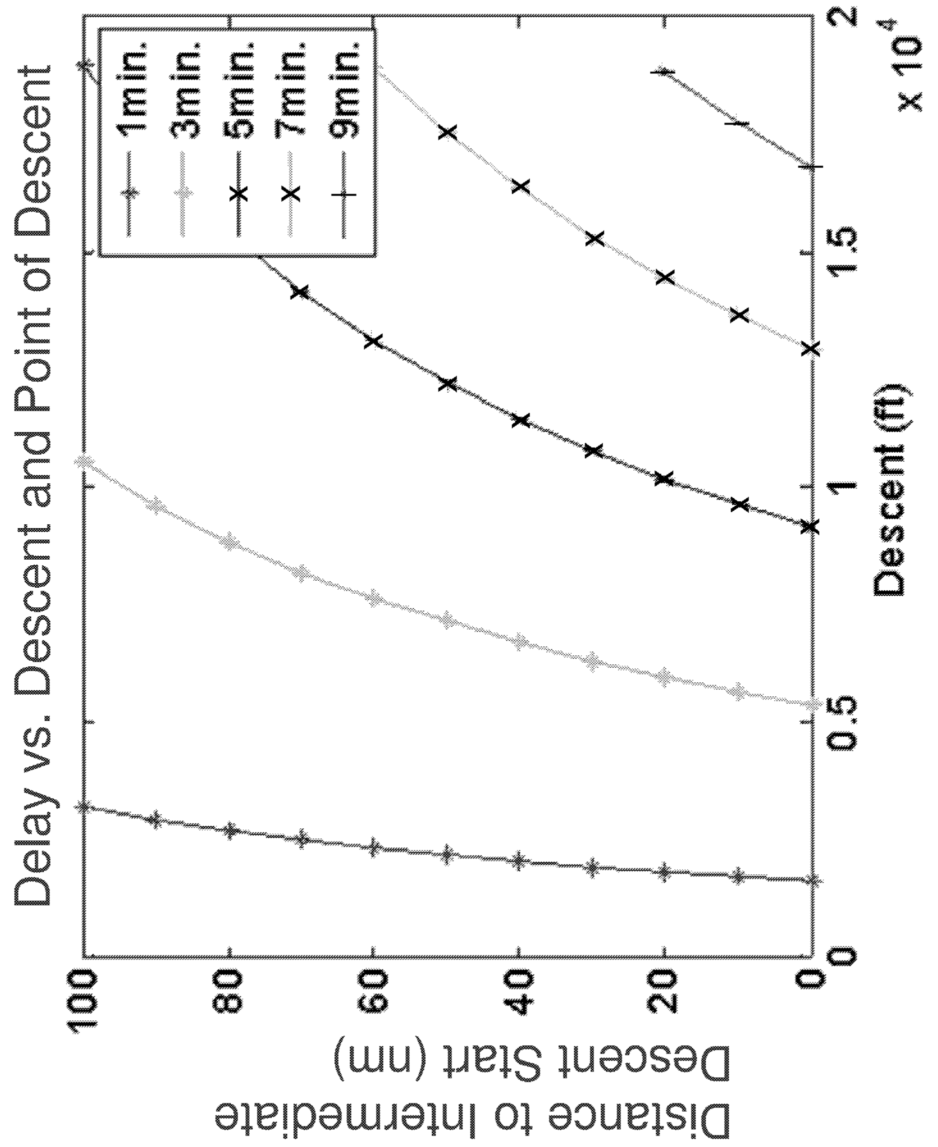
FIG. 3 is a graph that represents a relationship between a given time delay and altitude changes that can be employed to absorb the time delay from a certain distance to a meter-fix point in an early-descent maneuver.
Figure 4:
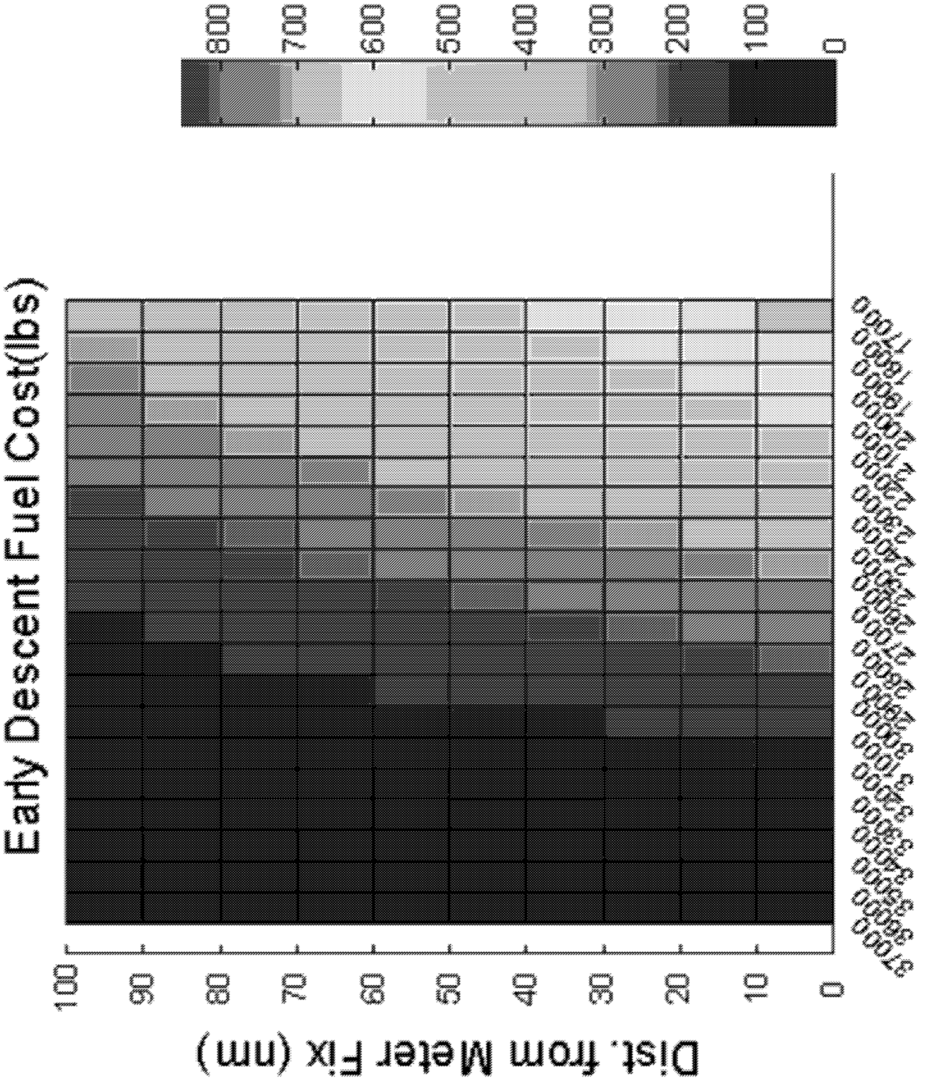
FIG. 4 represents that potential cost advantages may be achieved when absorbing a time delay in air traffic through the implementation of early-descent maneuvers to an aircraft's trajectory as compared to conventional lateral or speed changes.

When a time delay in air traffic must be absorbed, early-descent maneuvers of the type represented in FIG. 1 and made possible by the schedule management system of FIG. 2 can provide a distinct cost advantage over lateral or speed changes to an aircraft's trajectory. Experimental evaluations leading up to the present invention included simulations of multiple Boeing 737 model aircraft types, wind profiles, and meet-time goals, including simulations that generated the time-delay data graphed in FIG. 3 as well as predicted fuel cost plotted in FIG. 4. The graph in FIG. 3 represents a relationship between how much altitude change was required to absorb a certain time delay given a certain distance from a meter-fix point in an early-descent maneuver. While fuel use is generally higher for early cruise descents than for corresponding path stretches in constant wind conditions, the presence of non-constant wind fields was viewed as potentially providing significant fuel savings compared to a path stretch at a higher altitude. Also developed was a cost coefficients-based framework that can support a ground-based computation of an optimal meet-time schedule management maneuver. A discussion of such a framework is discussed in Torres et al., "Trajectory Management Driven by User Preferences," 30th Digital Avionics Systems Conference (Oct. 16-20, 2011), whose teachings regarding such a framework are incorporated herein by reference.

The cost of operating a flight may be decomposed into the cost of fuel and other direct and time related costs, including, but not limited to, crew pay, aircraft maintenance, passenger and cargo logistics, and equipment devaluation. Preferred embodiments of the invention involve the extraction of the effective operating cost from the on-board FMSs of aircraft. A suitable mechanism for calculating and evaluating operating cost may include the Cost Index, as discussed above and in Torres. Such calculations and evaluations for a specific aircraft would likely be located on the aircraft itself since the hardware requirements necessary for data storage and processing would be far less than required for the DST of the ground-based system. The information to be processed would be contingent on or directly relevant to a specific aircraft as opposed to generally pertaining to all aircraft within the air traffic being monitored by a given air traffic control center. The mechanism would then make that information available (down-linked) to the air traffic control system and its DST.

As noted above, Torres contains a discussion of a cost coefficients-based framework that can support a ground-based computation of an optimal meet-time schedule management maneuver, by which a new cost-optimized STA for an aircraft can be determined in response to an earlier aircraft missing its STA. Generally, such a framework involves an aircraft computing the cost (either relative to the current planned trajectory or an absolute cost) for various types of changes to its current planned trajectory, in terms of speed, lateral path change (increase in path length), or a change in cruise altitude. The cruise altitude change would most likely be a decrease in cruise altitude to reduce speed, though potentially an increase in cruise altitude may be appropriate, for example, if a stronger headwind at a higher altitude may result in an overall time delay capable of meeting a later STA for the aircraft necessitated by an earlier aircraft missing its STA. This cost information is transmitted to a DST on the ground (potentially as a set of cost coefficients from the aircraft).

In view of the above, the cost information can be used to determine if a particular course alteration would be a more efficient method of meeting a time schedule than, for example, a path stretch or another maneuver. A nonlimiting example of such a course alteration would be an early-descent trajectory that is optimal for meeting a new STA for an aircraft, a particular example being a later STA necessitated by an earlier aircraft missing its STA. The DST would compile available information provided by the aircraft into a more useful tool. If part of TBO described earlier, the DST generates and compiles the information by which trajectory negotiation can take place, and from which the DST preferably generates several possible alternative trajectories, one or more of which may be preferred by the aircraft operator and/or fit into the constraints of the existing air traffic environment. The intention is that the DST is able to facilitate better use of airspace and meet aircraft user-preferred trajectories by providing all the available flight data, as well as preferred trajectories, to one or more human users through an appropriate interface that allows the users to make decisions based on the trajectories and potentially additional information.

With access to the STA of the aircraft being managed, the DST can compute, based on the predicted aircraft trajectory, the ETA for the aircraft. If the ETA of the aircraft is sooner than its STA, there is a requirement to absorb time delay. Conversely, if the ETA of the aircraft is later than its STA, there is a need to temporally advance the aircraft. The ground-based DST may consider various combinations of speed changes (either a single speed instruction or as a time constraint, such as a Required Time of Arrival (RTA)), lateral path stretch or shortcut, and/or cruise altitude change. The cost surfaces constructed from the down-linked cost coefficients are utilized to evaluate and select a meet-time maneuver for the aircraft, and more preferably the best meet-time maneuver that appears to be most advantageous for the aircraft while meeting the STA at the arrival meter fix.

In view of the above, the present invention enables an early cruise descent as part of the feasible options set available to an air traffic controller, broadening the options set for meet-time schedule management. This increases the available degrees of freedom as well beyond speed changes and path stretches, allowing better identification of conflict-free trajectories that meet timing requirements in congested airspaces. With a broader options set, and a means to compute costs associated with each option, aircraft business objectives may be considered and satisfied.

While the invention has been described in terms of certain embodiments, it is apparent that other forms could be adopted by one skilled in the art. Accordingly, it should be understood that the invention is not limited to the specific embodiments described herein. Therefore, the scope of the invention is to be limited only by the following claims.

The invention claimed is:

1. A schedule management system for managing air traffic comprising multiple aircraft that are within a defined airspace and approaching an arrival airport, each of the multiple aircraft having existing trajectory parameters comprising three-dimensional position and velocity, the schedule management system comprising:

on-aircraft flight management systems individually associated with the multiple aircraft and adapted to determine aircraft trajectory and flight-specific cost data of the aircraft associated therewith;

an air traffic control system adapted to monitor the multiple aircraft but is not located on any of the multiple aircraft, the air traffic control system having a decision support tool, the air traffic control system being operable to acquire the aircraft trajectory and the flight-specific cost data from the flight management systems and generate a scheduled time-of-arrival (STA) for each of the multiple aircraft for at least one location along an approach to the arrival airport;

wherein if any of the multiple aircraft miss the STA thereof at the at least one location and thereby delays a second of the multiple aircraft flying towards the at least one location to impose a later STA for the second aircraft, the air traffic control system is operable to transmit the aircraft trajectory and the flight-specific cost data to the decision support tool, utilize the decision support tool to determine if a particular trajectory alteration is more cost-efficient for the second aircraft to absorb the delay associated with the later STA, and then transmit instructions to the second aircraft based on a human decision facilitated by the decision support tool.

2. The schedule management system according to claim 1, wherein the flight-specific cost data include at least one time-related flight-specific cost.

3. The schedule management system according to claim 1, wherein the particular trajectory alteration comprises a change in cruise altitude to reduce speed of the second aircraft.

4. The schedule management system according to claim 1, wherein the particular trajectory alteration comprises an early-descent trajectory to reduce speed of the second aircraft.

5. The schedule management system according to claim 1, wherein the at least one location is a meter fix point.

6. A method of managing air traffic comprising multiple aircraft that are within a defined airspace and approaching an arrival airport, each of the multiple aircraft having existing trajectory parameters comprising three-dimensional position and velocity, the method comprising:

determining aircraft trajectory and flight-specific cost data of each of the multiple aircraft with on-aircraft flight management systems individually associated with the multiple aircraft;

monitoring the multiple aircraft with an air traffic control system that is not located on any of the multiple aircraft;

generating with the air traffic control system a scheduled time-of-arrival (STA) for each of the multiple aircraft for at least one location along an approach to the arrival airport;

if any of the multiple aircraft miss the STA thereof at the at least one location and thereby delays a second of the multiple aircraft flying towards the at least one location to impose a later STA for the second aircraft, then;

transmitting the aircraft trajectory and the flight-specific cost data acquired from the flight management systems to a decision support tool of the air traffic control system;

utilizing the decision support tool to determine if a particular trajectory alteration is more cost-efficient for the second aircraft to absorb the delay associated with the later STA; and then transmitting instructions to the second aircraft based on a human decision facilitated by the decision support tool.

7. The method according to claim 6, wherein the flight-specific cost data include at least one time-related flight-specific cost.

8. The method according to claim 6, wherein the particular trajectory alteration comprises a change in cruise altitude to reduce speed of the second aircraft.

9. The method according to claim 6, wherein the particular trajectory alteration comprises an early-descent trajectory to reduce speed of the second aircraft.

10. The method according to claim 6, wherein the at least one location is a meter fix point.

* * * * *